United States Patent [19]
Seuntjens

[11] Patent Number: 5,897,963
[45] Date of Patent: Apr. 27, 1999

[54] COMPOSITE WIRES AND PROCESS OF FORMING SAME

[75] Inventor: Jeffrey M. Seuntjens, Bangam, Singapore

[73] Assignee: Composite Materials Technology, Inc., Shrewsbury, Mass.

[21] Appl. No.: 09/002,613

[22] Filed: Jan. 5, 1998

Related U.S. Application Data

[63] Continuation-in-part of application No. 08/370,621, Jan. 10, 1995, abandoned.

[51] Int. Cl.$^6$ .............................. B32B 15/02; B21C 23/24
[52] U.S. Cl. .......................... 428/607; 428/614; 428/655; 428/661; 72/253.1
[58] Field of Search .................................... 428/607, 614, 428/660, 661, 662, 663, 655, 656; 72/47, 253.1, 272

[56] References Cited

U.S. PATENT DOCUMENTS

| | | | |
|---|---|---|---|
| 3,910,802 | 10/1975 | Wong | 428/930 |
| 4,205,119 | 5/1980 | Young et al. | 428/930 |
| 4,746,581 | 5/1988 | Flukiger | 428/930 |
| 4,829,770 | 5/1989 | Hashimoto | 62/3.1 |
| 4,849,017 | 7/1989 | Sahashi et al. | 75/245 |
| 4,985,072 | 1/1991 | Sahashi et al. | 75/246 |
| 5,102,865 | 4/1992 | Woolf et al. | 428/930 |
| 5,104,745 | 4/1992 | Cave et al. | 428/930 |
| 5,116,429 | 5/1992 | Wong | 428/930 |
| 5,124,215 | 6/1992 | Hashimoto | 428/611 |
| 5,160,550 | 11/1992 | Wong et al. | 148/960 |
| 5,213,630 | 5/1993 | Hashimoto | 148/301 |

OTHER PUBLICATIONS

Seuntjens, J.M., et al; "Development of In Situ Second Phase Pinning Structure in Niobium–Titanium Based Superconducting Alloys" *IEEE trans. Mag.*, 27, No. 2, pp. 1121–1124, (Mar. 1991).

Reid, C.E., et al; "Selection of Magnetic Mterials for an Active Magnetic Regenerative Refrigerator" Cryofuel Systems, Inc., private communications, Sep. 12–17, 1993.

Myers, F.S.; "$Er_3Ni$ Regenerator Helps Superconductr Magnet Sustain 4K" MRS Bulletin; Mar. 1994.

Zimms, C.B.; *Astronautics Technology Center*, private communication, (1994) no month.

Steyert, W.A.; "Stirling–cycle rotating magnetic refrigerators and heat engines for use near room temperature"; *J. Appl. Phys.* 49(3); Mar. 1978; pp. 1216–1226.

Steyert, W.A.; "Rotating Carnot–cycle magnetic refrigerators for use near 2K"; *J. Applied Phys.* 49(3); Mar. 1978; pp. 1237–1231.

Kuriyama, T., et al; "High Efficient Two–Stage Gm Refrigerator with Magnetic Material in the Liquid Helium Temperature Region" *Advance in Cryogenic Engineering*, vol. 35, (1990); pp. 1261–1269 no month.

"Liquid–Free Cryocoolers Rearrange Market Equation for New Applications" *Superconductor week*, vol. 18, No. 8, pp. 1–2, Jun. 6, 1994.

Ludeman, E.M., et al; "Production of Spherical Powders of Rare Earth Intermetallic Compounds for Use in Cryocooler Regenerators" *Advances in Cyrogenic Engineering*, vol. 37, Part B, pp. 989–994 no month (1992).

Osborne et al; "Certrifugal Atomization of Neodymium and $Er3Ni$ Regenerator Particulate" *Advances in Cryogenic Engineering*, vol. 40, pp. 631–638 (1994) no month.

*Primary Examiner*—John J. Zimmerman
*Attorney, Agent, or Firm*—Hayes, Soloway, Hennessey, Grossman & Hage, P.C.

[57] ABSTRACT

Disclosed Is a process for the fabrication of rare earth or rare earth alloy materials in the form of fine wires for refrigeration regenerator applications. The wire is a composite consisting of a metal core and a metal sheath. The core material is comprises of at least a 20 atomic percent portion of rare earth metal as a pure metal, an alloy with other rare earth metals, or an intermetallic compound alloy with one or more non rare earth metals. The sheath material is essentially immiscible with the rare earth in the core, has no magnetic phase transitions in the temperature range for the intended operation, and has good corrosion and oxidation resistance. The sheath material is typically a small portion of the total composite wire cross section. The composite wire is fabricated from the co-reduction of an assembled billet by conventional wire processing techniques.

12 Claims, 1 Drawing Sheet

COMPOSITE WIRES AND PROCESS OF FORMING SAME

This application is in part a continuation of our application Ser. No. 08/370,621 filed Jan. 10, 1995 now abandoned.

FIELD OF THE INVENTION

The present invention relates to the field of refrigeration incorporating magnetic regenerators.

BACKGROUND OF THE INVENTION

Active magnetic regeneration refrigeration (AMRR) uses a magnetic material both as a regenerator material (to absorb and to reject heat) and as the working material creating the thermal cycle. A regenerator is a high efficiency heat exchanger which transfers heat from the part of the refrigeration cycle going from the hot to the cold heat sink to the part going from the cold to the hot heat sink. In AMRR, the magnetic materials are both the cooling agent and the regenerative medium. The active magnetic regenerator works in the same manner for heat pump applications, where the objective is to add heat to the hot sink, instead of refrigeration's interest in removing heat from the cold sink. Magnetic refrigeration technology promises high efficiency because the magnetization and demagnetization cycle on which it is based is nearly perfectly reversible. Efficiency gains are potentially large for refrigeration just below room temperature, and even larger for refrigeration requirements at lower temperatures. Materials comprising rare earth metals, rare earth/rare earth alloys, and rare earth/transition metal compounds have the highest known cooling power densities for Active Magnetic Regenerative Refrigeration technology. The optimal rare earth materials for cooling over a specific temperature range are chosen based upon the material's magnetocaloric effect (the adiabatic temperature change upon magnetization or demagnetization), the volumetric heat capacity, fabricability, and cost considerations.

The invention is also applicable to conventional gas compression cycle based refrigeration, which may also benefit in terms of efficiency and output from the incorporation of a high specific heat passive regenerator (not a working material as in active regenerators). The same rare earth containing materials preferred for magnetic refrigeration are also preferred for a passive regenerator because the magnetic phase transition creates a very high volumetric specific heat.

Magnetic refrigerators are based on the magnetocaloric effect (MCE) of certain materials to achieve cooling. The magnetic refrigerator concept was first proposed in 1925 and successfully implemented in 1933 to reach temperatures of 0.5 K, W. F. Giauque, *J. Am. Chem. Soc.*, 49, p. 1870, (1927), Debye, *Ann. Phys.* (Leipzig), 81, p. 1154, (1926), W. F. Giauque and D. P. MacDougall, *Phys. Rev.*, 43, p. 768, (1933). In the magnetic cycle, magnetic material is magnetized in a magnetic field and placed in thermal equilibrium with a high temperature source. The material is adiabatically demagnetized, and the magnetocaloric effect reduces the material's temperature. The material is then placed in contact with a cold source and allowed to absorb heat and reach temperature equilibrium with the cold source. The material is then magnetized again and the cycle repeated. This magnetization and demagnetization can be made nearly perfectly reversible, and therefore cycles with near Carnot efficiencies are possible. As a comparison, most conventional gas cycle refrigerators are on the order of 20–30% of Carnot efficiency, C. Reid, *Cryofuel Systems, Inc.*, private communication, (1994)., C. B. Zimm, Astronautics Technology Center, private communication, (1994), whereas a model AMRR heat pump efficiency is predicted to be approximately 63%, W. A. Steyert, *J. Appl. Phys.*, 49, pp. 1216–1226, (1978).

Modeling has been done to show that efficient refrigeration is economically possible near room temperature when rare earth metals or rare earth containing compounds are used as the working material in a magnetic cycle, W. A. Steyert *J. Appl. Phys.*, 49, pp. 1216–1226, (1978), G. V. Brown, *J. Appl. Phys.*, 47, pp. 3673–3680, (1976), W. A. Steyert, *J. Appl. Phys.* 49, pp. 1227–1333, (1978). Unlike the very low temperature magnetic refrigerators (<1.5 K) which operate in a single magnetic cycle, the cycle for refrigeration at higher temperatures can be effective at frequencies of ~1.0 Hz. Helium gas, water, or some other suitable fluid (depending on the temperature range) can be used as a medium to transport heat from the cold to the hot heat sink. The active magnetic regenerative materials employed in such cycles are the key to implementing this technology. Only yttrium and/or rare earth containing materials have a large enough magnetocaloric effect to provide sufficient enthalpy per unit volume to make practical magnetic refrigeration possible.

The literature indicates that a given rare earth material has its strongest MCE over a temperature range of about 10–40 K centered just above the Curie temperature of the material. An example is gadolinium which has a Curie temperature of 293 K. The MCE of Gd causes an adiabatic temperature change of approximately 14 K or a isothermal heat absorption of 4 kJ/kg by the application of a 7 T magnetic field as reported by Brown, *J. Appl. Phys.* 47, pp. 3673–3680, (1976). Most materials will have little temperature change or heat absorption under similar conditions. This large temperature change can make magnetic refrigeration possible. For any given rare earth material, the most efficient working temperature range is restricted to approximately 40 K or less. For this reason, the highest efficiencies are realized in refrigerators covering a large temperature span when a series of rare earth containing compounds are employed. Magnetic refrigeration can be accomplished most efficiently by using different rare earth materials for different temperature ranges. A review of the literature indicates that a general consensus is forming for the preferred materials at specific temperature ranges. Some of these are summarized in Table 1 below. Choices for the optimal rare earth or alloy to use are based upon the material's magnetocaloric effect, the magnetic transition temperature, costs, and fabricability.

TABLE 1

| Material | Optimal Temp. Range (K) |
|---|---|
| Gd | 270–320 |
| $Gd_{0.6}Dy_{0.4}$ | 235–270 |
| Tb | 220–240 |
| Dy | 170–185 |
| $GdNi_2$ | 65–90 |
| $(Dy_{0.5}Er_{0.5})Al_2$ | 25–60 |
| $Er_3Ni$ | 4–20 |
| Nd | 4–20 |

The magnetic ordering near the rare earth material's Curie temperature also results in an unusually large specific heat. For example, the volumetric heat capacity of lead, neodymium, and $Er_3Ni$, at approximately 7 K are 0.05, 0.30 and 0.39 J/K $cm^3$, respectively, as reported by Aprigliano, Green, Chafe, O'Connor, Biancanello, and Ridder, *Adv. in*

Cry. Engr., vol. 37B, pp. 1003–1009, (1992). The enhancement of the heat capacity and heat absorbed or rejected due to the magnetocaloric effect is dependent on the temperature range and the material compound of interest. The enhanced heat capacity feature is advantageous for both active and passive regenerator applications.

To obtain rapid and efficient transfer of heat, the regenerator magnetic material must have a high surface area to volume ratio. The packing density of the material must also be homogeneous to allow uniform and complete heat transfer to the fluid as well as provide a uniform fluid pressure drop to minimize turbulence losses in the fluid.

Because of the above constraints, magnetic regenerator materials for AMRR's are required to be subdivided very uniformly on a size scale on the order of 50–200 $\mu$m diameter (10,000–40,000 $m^2/m^3$ surface area per unit volume) to provide adequate heat transfer at frequencies on the order of 1 Hz, C. Reid, *Cryofuel Systems, Inc.*, private communication, (1994). The packing density should be on the order of 60% for efficient utilization of the high magnetic field volume created by a superconducting magnet.

Conventional gas cycle refrigerators working at cryogenic temperatures can also benefit from the incorporation of a magnetic regenerator, because these materials have the highest known specific heats in the temperature range near their magnetic ordering temperature. In this application, the regenerator is passive, i.e., the regenerator is only used to absorb and reject heat and is not a working material. High efficiency Gifford McMahon (GM) type cryocoolers have been already built incorporating $Er_3Ni$, T. Kuriyama, R. Hakamada, Y. Tokai, M. Sahashi, R. Li., O. Yoshida, K., Matsumoto, and T. Hashimoto, *Adv. in Cry. Engr.*, Vol. 35, pp. 1261–1269, (1990) and Nd, *Superconductor Week*, vol. 18, no. 8, pp. 1–2, Jun. 6, (1994), as passive magnetic regenerators. The passive regenerator issues of the regenerator geometry, heat capacity, stability, fabricability, cross section uniformity, and cost are similar to the active magnetic regenerators situation. Further enhancements in the GM refrigerator performance are possible with the use of regenerator materials in fine wire form.

Many rare earth metals possess considerable ductility in pure form. Rare earth/rare earth alloys are often ductile, particularly alloys comprised of metals that are close in atomic radius. Alloys of rare earths with transition metals of interest for AMRR materials are frequently intermetallic line compounds with almost no ductility. Processes to date for manufacturing some AMRR materials have involved crushed granular materials and melt solidification of droplets.

Crushed granular materials are only applicable to intermetallic compounds which are very brittle. The process involves melting and casting of a regenerator compound of the desired composition and mechanically crushing the brittle material until it passes through an appropriate sized sieve. Material made in this fashion is not uniform in particle diameter, E. M. Ludeman and C. B. Zimm, *Adv. in Cry. Engr.*, 37B, pp. 989–994, (1992). These particles are irregularly shaped and do not pack to a homogeneous density. As a result, the heat transfer from the regenerator material to the helium gas is less than perfect and the efficiency of a resulting regenerator is compromised.

Another means of fabricating particles of regenerator material is by forming them directly from a melt by the quenching of droplets. Centrifugal atomization processes involve the flow of liquid metal of the desired composition for a regenerator onto a disk for atomization and quenching in a bath, M. G. Osborne, I. E. Anderson, K. A. Gschneider, M. J. Gailoux, and T. W. Ellis, *Adv. in Cry. Engr.*, 40, pp. 631–638, (1994). Low velocity jet particulation involves the solidification of liquid droplets during free fall, E. M. Ludeman and C. B. Zimm, *Adv. in Cry. Engr.*, 37B, pp. 989–994, (1992). Several other process variations of forming particles from a melt exists, all with similar limitations. While these processes can result in powders of quite uniform spherical shape, they are limited by rather slow production rates and by reactivity of the rare earth containing material during their fabrication, as well as subsequent handling during sieving, compacting of the powders, and assembly into the regenerator.

Another problem with both the crushed granular and melt solidification type processes is the very low yield of product of an acceptable size range. It is common for the majority of the resulting powders to be too big or too small for use in a regenerator system. The out of size particles may not be recyclable due to oxygen, carbon, and nitrogen pickup. Osborne et al, M. G. Osborne, I. E., Anderson, K. A. Gschneider, M. J. Gailoux, and T. W. Ellis, *Adv. in Cry. Engr.*, 40, pp. 631–638, (1994), report yields of 27% and 43% respectively for Nd and $Er_3Ni$ material made by centrifugal atomization. The high cost of rare earth raw materials makes any low yield process unacceptable in terms of cost.

The fine wire form for a regenerator material provides for several potential variations in its final configuration. Theoretical modeling of regenerator materials indicate that one of the preferable configurations is in the form of wire cloth screens. Screens require the development of processes to fabricate regenerator materials in the form of fine wires. A configuration similar to a screen can also be made from expanded sheet.

The patent prior art contains several patents on magnetic refrigeration materials. U.S. Pat. No. 4,849,017 covers a compound with 50 to 75% rare earth and the remainder from one or more of the metals Co, Al, or Ni. The claims also mention sintered bodies of these compounds with densities of at least 5 $g/cm^3$.

U.S. Pat. No. 4,985,072 covers a fine particulate morphology compound of a rare earth metal and either Al, Ni, Co, Fe in a metallic binder. The binder may be up to 80% by volume and the preferred composition mentioned is one of the elements Ag, Au, or Cu.

U.S. Pat. No. 5,213,630 and its related U.S. Pat. Nos. 5,124,215 and 4,829,770 cover magnetic refrigeration materials with compositions $RE(T)_2$ where RE is a rare earth element and T is one or more of the elements Al, Ni, Fe, or Co in a sintered body. This art describes the placing of these materials in a series of 3 or more compounds in stages to allow each stage to work at a particular temperature range and the device to cover a wide temperature range.

BRIEF DESCRIPTION OF THE INVENTION

The present invention relates to rare earth or rare earth alloy materials in the form of fine wires or sheets for magnetic refrigeration applications and the process of manufacturing such wires and sheets. The wire or sheet is a composite consisting of a metal core and a metal sheath. The core material comprises at least a 20 atomic percent portion of rare earth metal as a pure metal, an alloy with other rare earth metals, or an intermetallic compound alloy with one or more non rare earth metals. The sheath material is essentially immiscible with the rare earth in the core, has no magnetic phase transitions in the temperature range for the intended operation, and has good corrosion and oxidation resistance. The sheath material is preferably a relatively small portion of the total composite wire cross section. The composite wire is preferably fabricated from the co-reduction of an assembled billet by conventional wire processing techniques. The process also allows for the formation of sheet or expanded sheet made from flat rolled, intermediate sized composite rod. The disclosed processes are applicable to any choice of the rare earth magnetic regenerator materials.

None of the prior art mentions the use of a regenerator material in wire form providing a highly uniform cross sectional area. The prior art does not mention the incorporation of a metal sheath of only a few volume percent which prevents the degradation of the regenerator properties due to oxidation or corrosion. The prior art does not describe the use of regenerator materials in the form of uniform packing structures based on a wire element.

DETAILED DESCRIPTION OF THE INVENTION

Wire drawing of pure rare earth metals or rare earth/rare earth alloys by themselves is not practical for fine wire sizes. The rare earth metal may work harden and require periodic annealing. These anneals increase the oxygen content in bare rare earth wire, which further limits the ductility. Oxygen pick up is an increasingly more serious problem at fine wire sizes because the large surface area to volume ratio of fine wire increases the rate of oxidation. Rare earths have among the highest oxygen affinity of all metals, which makes gettering in the furnace (sacrificial oxidation of a different metal with higher oxygen affinity than the sample being heated) ineffective at preventing oxidation.

The present invention incorporates, in a preferred form, the use of a multifunctional Nb diffusion barrier between the rare earth material and a copper or copper alloy sheath required for wire drawing. The Cu alloy sheath and the barrier fraction can be minimized to a few percent of wire cross section. Copper sheath alloys can be chosen to minimize eddy current heating in the time varying magnetic fields used in AMRR technology. If it is desirable to remove the Cu alloy sheath, the barrier has an added benefit of providing a wire with a surface that is much less sensitive to oxidation and moisture related degradation than would be the case for the rare earth containing regenerator material by itself.

While Nb is the most preferred barrier material, several other metals can also server as a barrier material. The elements, Ta, Mo, and V are also insoluble in many rare earth metals and copper and thus serve to prevent diffusion therebetween. Ti is also immiscible in most rare earth metals as demonstrated in J. M. Seuntjens and D. C. Larbalestier, *IEEE Trans. Mag.*, 27, no., 2, pp. 1121–1124, (1991), but will react with copper at elevated temperatures and its use as a barrier may require another barrier metal between the Ti and Cu.

The rare earth material core of the composite wire can be arranged in several different configurations. The core can be a pure rare earth metal, a metal alloy of two or more metals, an assembly of alternating sheets of another pure metal or metal alloy. In each of the alloy cases, at least one of the components is a rare earth material.

In preferred forms of the invention, the rare earth material contains one or more of the following elements: Yttrium, Scandium, Lanthanum, Cerium, Praseodynimum, Neodynimum, Samarium, Europium, Gadolinium, Terbium, Dysprosium, Holmium, Erbium, Thulium, Ytterbium, or Lutetium metals and intermetallic compounds containing these elements.

To summarize the important aspects of the product of the present inventions: it is a composite wire or ribbon having a high surface to volume ratio comprising a core of rare earth containing material comprising an element selected from the group consisting Yttrium, Scandium, lanthanum, Cerium, Praseodynimum, Neodymium, Samarium, Europium, Gagolim\nium, Terbium, Dysprosium, Holmium, Erbium, Thulium, ytterbium, and Lutetium, and mixtures and intermetallic compounds thereof. the core preferably comprises at least 20 atomic percent portion of rare earth material. The core material also preferably has a curie point less than 300° K. and has a volumetric heat capacity in excess of 0.10 $J/Kcm^3$ at its curie point. The core is not superconducting at 4.2° K. The core has an adiabatic temperature range of at least 10° K. for a magnetic field of 7 Tesla at a temperature within 20 degrees around its curie point. The composite wire or ribbon includes a metal sheath surrounding said core and comprised of pure metal, metal alloy or an assembly of two or more metal alloys which act as a diffusion barrier around said composite core, said metal sheath barrier comprising an element selected from the group consisting of Nb, Ta, V, Mo, and Ti, and mixtures thereof. the composite wire or ribbon is preferably formed by assembly of the raw materials at a larger size and co-processing to final wire by one or more extrusion, drawings, or rolling operations with an area reduction of at least 10 time, said metal sheath barrier being a relatively small portion of the total wire or ribbon cross section.

BRIEF DESCRIPTION OF THE DRAWINGS

Examples of implementation of the disclosed invention are provided below wherein like numerals depict like parts, and wherein.

Figure 1:
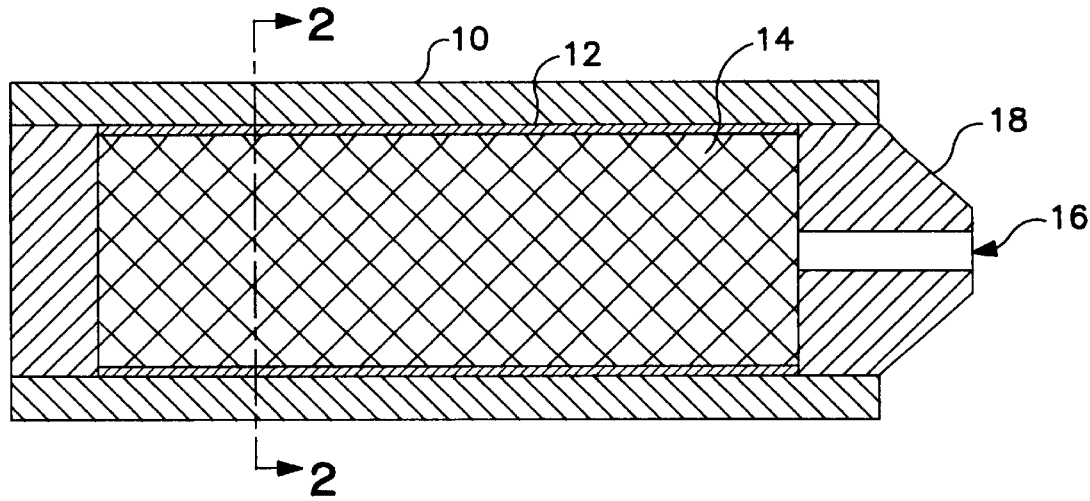
FIG. 1 is a schematic longitudinal sectional view of a starting ingot for manufacturing a preferred form of the invention.

One disclosed billet design for both pure rare earth and rare earth alloy composite wires is shown schematically in FIG. 1. The rare earth staring ingot is shown at 14 which is surrounded by a copper or copper alloy jacket 10 which provides a convenient extruding and drawing surface to process the wire. A diffusion barrier 12 is typically in the form of multiple wraps to prevent gaps or large overlap areas. As mentioned, a preferred barrier is Nb.

When removal of the Cu or Cu alloy jacket is required, the diffusion barrier thickness at the etching stage should be approximately 2 $\mu$m or more to prevent the occurrence of localized barrier failure. Therefore, the volume percent of barrier in the final etched wire will be a function of the composite wire diameter. Table 2 below contains the minimum barrier fraction for several different composite wire diameters.

TABLE 2

Barrier volume fraction required to provide a 2 μm thick barrier at different final size composite wire diameters (R.E. = rare earth).

| Barrier thickness (μm) | R.E. + barrier dia. (μm) | Volume % barrier |
| --- | --- | --- |
| 2 | 250 | 3.2 |
| 2 | 100 | 7.8 |
| 2 | 50 | 16 |
| 2 | 25 | 29 |

The minimum Cu alloy jacket comprises on the order of 5–10 volume % of the composite, therefore it would be preferable to leave the jacket on if possible for wire diameters less than about 50 μm. The jacket material can be made of Cu alloyed with either Sn, Si or Mn bronze, Ni or Zn with high resistivity to reduce eddy current heating in changing magnetic fields. If the Cu or Cu alloy jacket removal is not required, a 1 μm Nb barrier thickness at the composite size at the last annealing treatment is likely to be sufficient, which can significantly increase the volume fraction of the rare earth in the composite at small wire diameters.

In processing the composite billet into fine wire, first the rare earth material 14 and Nb 12 are cleaned with acetone and the Cu or Cu alloy can 10 is etched in nitric acid prior to assembly. The billet is assembled and welded shut. An evacuation tube 16 placed in the nose 18 of the billet is used to pump out the billet at an out gassing temperature of about 400° C. After sealing the evacuation tube, the billet is hot extruded with an areal reduction ratio in the range of 8 or more. The extrusion temperature is typically at least 100° C. below the melting point of the respective rare earth metal, rare earth metal alloy, Cu, or Cu alloy employed in the billet. The resulting rod is cold drawn to the desired size.

Since the rare earth material is likely to work harden, periodic anneals of the composite may be required between some cold drawing steps. The anneals should be hot enough to quickly soften the rare earth containing core 14 of the composite without providing extended time to allow significant grain growth or diffusion of the rare earth or elements of the Cu can 10 alloy material through the Nb barrier 12. The cold drawing is continued in this step-like draw and anneal manner. If it is desired to remove the Cu or Cu alloy jacket 10, the final wire is placed in a nitric acid solution until the jacket is dissolved. The nitric acid does not attack the Nb barrier 12. The volume fraction of the Nb barrier needed is controlled at billet assembly to provide a minimum Nb thickness at the etching stage of 2 μm to prevent acid burn through the Nb barrier. If the Cu alloy jacket is not to be removed for application where time varying magnetic fields are encountered, an alloy will be chosen with a high resistivity to minimize eddy current losses. A Cu alloy jacket may also be preferable if it provides a better mechanical match to the rare earth containing material in the core of the composite wire.

Another variation of this form of the invention is to divert the intermediate sized composite wire rod to deformation by rolling. Like in wire drawing, occasional anneals of the sheet may be necessary to reach the final desired sheet thickness. The regenerator can be made from the as-rolled sheet or the sheet can be slit and expanded to form a mesh with diamond shaped holes for fluid transfer passages. The expanded sheet models a screen geometry.

In these processes, exposure of the rare earth material to atmosphere oxygen and humidity is minimized whereby the magnetic properties and chemistry of the rare earth material is essentially unchanged during wire or sheet processing, the regenerator and refrigerator/heat pump assembly, or throughout the system's service life.

Figure 4:
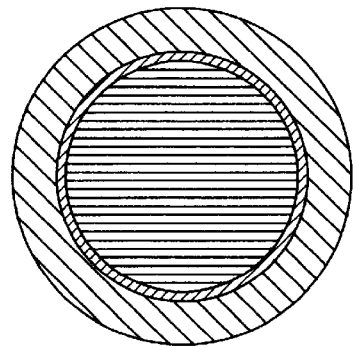
FIG. 4 is a transverse section of FIG. 3 along the line 4 . . . 4.
Figure 3:
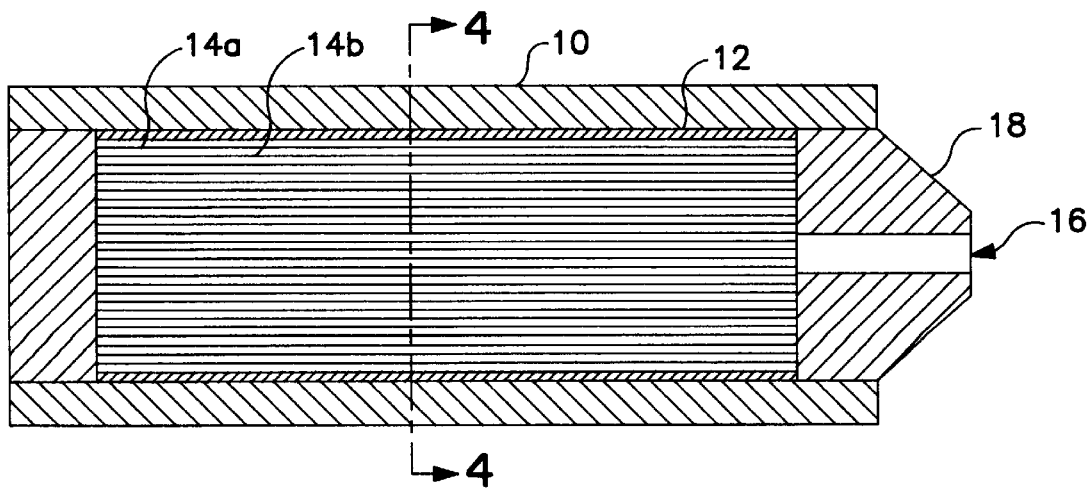
FIG. 3 is a view similar to FIG. 1 of another preferred form.

In another form of the invention, the billet is designed for providing rare earth intermetallic compounds. A starting billet for this form is shown in FIGS. 3 and 4. This type of billet design is used when co-melting of the metals in the desired overall composition is either prohibitively expensive or results in an ingot with insufficient ductility to process in the manner described above. A Cu or Cu alloy can 10 is employed which is lined with a Nb diffusion barrier 12. In one preferred method, sheets of rare earth metal 14a and transition metal 14b are stacked together in an alternating fashion. The thicknesses of the respective sheets are carefully controlled to provide an atomic ratio closely matching the stoichiometric intermetallic compound. For example, the intermetallic compound $GdNi_2$ can be made near stoichiometry by using alternating sheets of Gd and Ni with relative thicknesses of 3 to 2 respectively. In the case of $Er_3Ni$, the relative sheet thicknesses of Er and Ni are approximately 9 to 1, respectively. The rare earth sheet component may comprise a pure rare earth metal, an alloy of two or more rare earth metals, or two or more sheets of either different or similar pure rare earth metals. In the same manner, the transition metal sheet can comprise a pure metal, an alloy of two or more transition metals, or two or more sheets of different or similar pure transition metals. This assembly can provide desired overall compositions for any compound of 2 or more metals. Sometimes multiple thin sheets of the same material can be used to provide a thicker total desired thickness. It is preferred that the assembled sheets are known to be ductile and co-process well with each other.

Other variations on the stacking arrangements for the components of an intermetallic compound billet are also within the scope of the invention. Instead of sheets, rods of the materials can be assembled in a similar manner as was described for sheets in the paragraph above. The same holds true for two or more components comprised of either rods and tubes, jelly roll (two long sheets rolled together), modified jell roll (where one of sheets being rolled is an expanded sheet), chopped wires, or mixed powders.

Figure 2:
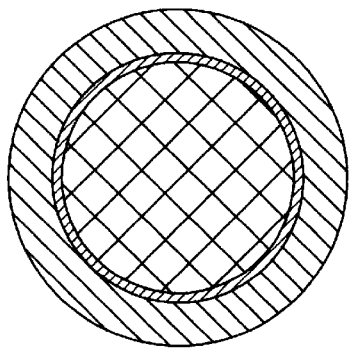
FIG. 2 is a transverse section of FIG. 1 along the line 2 . . . 2.

The billet is welded, evacuated, and hot extruded in the same manner as described above for the rare earth metal or rare earth alloy billet process of FIGS. 1 and 2. The extrusion temperature is typically chosen to be at least 100° C. or more below either the lowest melting point eutectic in the particular rare earth/transition metal system employed in the billet, or the melting point of any of the billet components, to prevent melting by adiabatic heating during extrusion. The material is cold drawn to the desired final diameter. When work hardening appears to be excessive, the composite will be annealed to quickly recrystallize the component while minimizing the amount of reaction between the rare earth and transition metal sheets. At the final composite diameter, the combined thickness of the rare earth and transition metal sheets (or other stacking permutation) will be on the order of 1–10 μm and typically less than 100 μm. The approximate diffusion distance required to react these layers to form nearly homogeneous intermetallic compound should be about half of the combined thickness, or on the order of 0.5–5 μm. This size scale is known to be within the size range for complete interdiffusion at a reasonable reaction time and temperature.

The composite wire is fabricated into its final ordered regenerator configuration, such as a braid, screen, etc. prior to heat treatment if the ductility of the final desired rare earth containing compound is limited. As discussed in connection with FIG. 1 above, the intermediate sized composite rode wire can be diverted to rolling to fabricate a sheet product. The sheet may be used as is or slit and expanded as discussed above. The optimal diffusion time and temperature to create the desired compound from the finely spaced raw material sheets is determined empirically. The diffusion temperature must be on the order of 20–50° C. below the lower melting point between either the rare earth and the transition metal and transition metal and Nb. The rare earth is essentially immiscible with Nb up to the melting point of the rare earth metal. The extent of the interdiffusion can be examined by either metallography or scanning electron microscopy.

If desired, the Cu or Cu alloy jacket can be removed in the same procedure described for the rare earth metal or rare metal alloy billets above.

EXAMPLES OF THE DISCLOSED PROCESS TECHNOLOGY

Example 1—Fabrication of Pure Dysprosium Metal AMR Wire

The billet design for this proof of principle work was similar to the schematic of FIGS. 1 and 2. A commercial grade Dy ingot 14 of 37.8 mm diameter by 76.2 mm long was obtained. The Dy ingot had 1690 ppm of oxygen, 3000 ppm Ta, 220 ppm N and 110 ppm C as its principle impurities. The resulting Nb barrier 12 consisted of one wrap of 0.38 mm and one wrap of 0.25 mm sheet, resulting in a total thickness of 0.635 mm and a volume fraction relative to the Dy of 6.4%. The pure copper can 10 used has an O.D. and I.D. of 51 and 39.6 mm, respectively. To minimize the exposure of the Dy to atmosphere oxygen and humidity, the billet can and Nb barrier materials were machined and cleaned prior to opening the fly packaging. The Dy ingot was cleaned with a wire brush wheel. The billet was quickly assembled and billet end caps were welded in place. The nose 18 of the billet contained a copper tube 16. The welded billet was heated to 370° C. with the copper tube under $10^{-5}$ Torr diffusion pump vacuum for 1–2 hours. The tube 16 was then sealed off.

The billet was hot extruded at 650° C. to 12.7 mm diameter. The extruded rod was cropped on both ends to obtain a steady state cross section. The composite material was cold drawn to fine wire. It was found that periodic annealing was required to restore the ductility of the Dy. Anneals of 500° C. in an argon atmosphere for a few minutes were used. After several iterations, it was found that the area reduction should be limited to 44% between anneals for the anneal time and temperature employed. For a final chosen composite diameter of 200 $\mu$m, the Dy core was 150 $\mu$m and the Nb barrier was nominally 2.5 $\mu$m, and the Cu jacket was nominally 23 $\mu$m thick.

It may also be desirable in regenerator applications to remove the Cu or Cu alloy material by etching. The Nb barrier, which prevents the reaction between Cu and Dy during processing, is not attacked by nitric acid. If the Nb is more than about 2 $\mu$m in thickness, it is effective to allow the removal of the can material without the acid attacking the Dy. The Nb barrier in this work was 6% by volume, which ideally is effective for Dy+Nb diameters down to about 100 $\mu$m. In the case above, removal of the Cu leaves a composite wire diameter of approximately 155 $\mu$m.

Example II—Fabrication of Intermetallic GdNi$_2$ Regenerator Wire

A billet design and process for the fabrication of GdNi$_2$ is described here. The schematic billet design for the GdNi$_2$ model billet is shown in FIGS. 3 and 4. A Cu or Cu alloy can 10 with a 51 mm O.D is used. Two or more sheets of Nb diffusion barrier 12 are cut and placed in the can so as to have no gap or significant overlap for each sheet. The volume fraction of barrier relative to the rare earth containing core should be determined so as to provide a Nb barrier thickness at the final wire size on the order of the diffusion distance required to form the intermetallic compound. In the example that follows, the Nb thickness is 0.76 mm or about 7% of the non Cu alloy jacket cross section. Sheets of 0.76 mm Gd 14a and 0.51 mm Ni 14b provide an atomic ratio closely matching GdNi$_2$. Nineteen pairs of such Gd and Ni sheets are stacked in an alternating fashion inside the billet. The width of the sheets is varied to provide a nearly circular cross section of 43.2 mm diameter. The 51 mm diameter GdNi$_2$ billet is welded, evacuated and extruded in the same manner as the Dy billet in the example above.

The billet is extruded at 590° C. to a diameter of 0.5 inch. This extrusion temperature is 100° C. below the lowest melting point in the Gd-Ni system, 85° C. below the lowest melting point in the Gd-Cu system, and 585° C. below the lowest melting point in the Nb—Ni system. The extruded material is cropped and cold drawn to the final size wire. When work hardening appears to be excessive, the composite is annealed to quickly recrystallize the components while minimizing the amount of reaction between the Gd and the Ni. Drawing and the associated anneals continues until a final diameter of 300 $\mu$m is reached. At this composite diameter, the combined thickness of the Gd and Ni will be 7.6 $\mu$m. The approximate diffusion distance required to react these layers to homogeneous GdNi$_2$ is about half of this value, or 3.8 $\mu$m. The Nb barrier thickness is 4 $\mu$m.

After the final diameter composite is formed into its regenerator configuration, the material is heat treated to fully diffuse the layers. A temperature of 650° C. is likely to be nearly optimal, which is close to the lowest melting temperature in the Gd—Ni system. The diffusion time and temperature must be determined empirically. The extent of the interdiffusion can be examined by metallography or scanning electron microscopy to verify the composition homogeneity.

The Cu or Cu alloy jacket can be removed in the same procedure developed for the Dy experiment billet described above. The remaining jacketless wire will be approximately 225 $\mu$m in diameter.

Example III—Fabrication of Nd Into Ribbon for Regenerator Application

An alternative configuration to wire screens or mesh is to rolled the wire into a thin ribbon and then emboss the surface with small raised ridges or bumps. The ribbon is then wound into a pancake coil with the embossed feature serving to separate the layers of the winding. It is then possible to control the volume void fraction by controlling the height of the embossed features and the thickness of the ribbon. Multiple pancake windings can then be stacked vertically to form the regenerator volume.

An ingot of commercially pure Nd was purchased in the shape of two cylindrical billets 50.8 mm in diameter and 203.2 mm in length. The billets were machined to remove surface casting roughness and then hydrostatically extruded to 47.625 mm in diameter. After hydrostatic extrusion, the surface of each billet was cleaned and finish machined to 44.45 mm. The Nd was assembled into a copper tube with a 0.762 mm thick Nb sheet for the barrier, accounting for 6.6% of the non-copper area. The Nd ingots were wire brushed and wiped with acetone prior to assembly to remove as much surface oxide and contamination as possible to help promote good bonding of the components. The Nb sheet and Nd ingots were then inserted into 50.8 mm OD, 46.482 mm ID copper tubes and a copper nose and tail were TIG welded to enclosed each billet. The enclosed billets were evacuated and then sealed for conventional hot extrusion.

The billets were extruded at 590° C. to 12.7 mm diameter. After extrusion the rods were cropped until the Nb barrier was complete around the Nd. Samples of each extrusion were drawn using a 20% reduction die line until 2.362 mm diameter without any intermediate anneals. The sample pieces showed much better drawability than initially hoped for, so a drawing schedule was established with anneals every half diameter in order to lessen the severity of point breaks during drawing and improve barrier uniformity. Anneals were conducted in a strand annealing furnace at 480° C. to limit the time exposed to high temperature to a minimum. Material was successfully drawn to sizes ranging from 1.615 mm to 0.942 mm diameter. At final size the copper jacked was removed by nitric acid.

The neodynium wire was then rolled to ribbon using a Fenn rolling mill with two high and four high roll configurations where the diameter of the work rolls is 213.4 mm and 60.325 mm respectively. The roll speed was maintained at 18 rpm throughout the operations. During the entire rolling process, 4.5 kg of tension was applied to the neodymium ribbon using a digitally controlled pay-off and take-up reel system. The two high roll configuration was used of the first two passes to impart a large reduction in thickness, approximately 50% to 70% reduction per pass. Since neodymium hardens very rapidly and becomes brittle, an anneal was used after the second pass to soften the material. The annealing process was carried out at 450° C. temperature, with one hour holding time at the temperature, and a continuous argon gas flow during heating and cooling cycle. The four high roll configuration was used of the third through sixth passes, with an anneal after the sixth pass. Reduction was approximately 20 percent in thickness per pass. Embossing of the ribbon was done during the seventh (final) pass utilizing one 60.325 mm diameter knurled roll which imparts the 3.175 mm wide ribbon with 0.0254 mm or 0.0508 mm high ridges, 1.588 mm apart. A final annealing completed the fabrication of the neodymium ribbons.

This project successfully produced 18.5 m of 0.254 mm thick ribbon with a 0.0508 mm ridge height. This would yield a theoretical void volume of 20 percent when the tape was coiled. Also produced was 46.2 m of 0.178 mm ribbon with a 0.0254 mm ridge height. The void volume of this sample was calculated to be 15 percent.

The surface to volume ratios of the two ribbons were as follows:

0.254 mm ribbon—8548 $m^2/m^3$ 0.178 mm ribbon—11,776 $m^2/ml^3$

Advantages of the Invention over Existing Technology

The ability to fabricate magnetic regenerator materials in fine wire form for AMRR or conventional cryocooler applications has several strong advantages over existing technology. Each advantage is described below:

1). Uniformity of material cross section—The wire geometry provides for perfect uniformity of the cross section.

2). Control of cross section area—The material cross section can be controlled simply by selecting the desired final drawing die diameter of the final product.

3). Incorporation of a protective sheath—The proposed Nb barrier results in a sheath around the rare earth regenerator material that virtually eliminates problems with humidity, oxygen, and nitrogen during the handling and assembling of the rare earth containing material into the regenerator and refrigerator/heat pump system. Problems with the degradation of the material over the life of the regenerator are greatly reduced. The cross sectional area fraction of the Nb barrier is too small to significantly effect the overall efficiency of the regenerator. The barrier maintains the highest possible ductility of the rare earth containing core to make manufacturing of the regenerator configuration as easy as intrinsically possible.

4). Flexibility for development of uniform packing structures—The uniform packing of the regenerator material allows for optimal heat transfer and helium pressure drop. The development of regenerator materials in fine wire form permits the development of wire cloth screens, braids, or other near ideal configurations.

5). High yield—The yield for production extrusion and draw processes is on the order of 80 to 85%. This is at least double the efficiency of other known processes for fabricating regenerator materials. No yield losses in melting, powder size sorting, or processing contamination are present.

6). No melting processes required—In the case of some rare earth alloys and intermetallic compounds, a solid state diffusion reaction at the final wire diameter can be used to form the final compound. Capital and labor intensive melting operations are not needed.

What is claimed is:

1. A composite wire for use as a regenerator material in refrigeration applications, said wire having a surface to volume ratio in excess of 8,000 $m^2/m^3$ comprised of a core of rare earth containing material comprising an element selected from the group consisting of Yttrium, Scandium, lanthanum, Cerium, Praseodynimum, Neodymium, Samarium, Europium, Gadolinium, Terbium, Dysprosium, Holmium, Erbrium, Thulium, Ytterbium, and Lutetium, and mixtures and intermetallic compounds thereof, said core comprising at least 20 atomic percent portion of rare earth material said core having a curie point less than 300° K., said core having a volumetric heat capacity in excess of 0.10 $J/Kcm^3$ at its curie point, said core having no superconducting properties at 4.2° K., said composite wire containing a metal sheath surrounding said core and comprised of pure metal, metal alloy or an assembly of two or more metal alloys which act as a diffusion barrier around said composite core, said metal sheath barrier comprising an element selected from the group consisting of Nb, Ta, V, Mo, and Ti, and mixtures thereof, said composite wire being formed by assembly of the raw materials at a larger size and co-processing to final wire by one or more extrusion, drawing, or rolling operations with an area reduction of at least 10 times, said metal sheath barrier being a relatively small portion of the total wire cross section.

2. The composite wire of claim 1 wherein the core has an adiabatic temperature change of at least 10° K. for a magnetic field of 7 Tesla at a temperature within 20 degrees around its curie point.

3. The product of claim 1 wherein the final core is an intermettalic compound of a rare earth and another metal and a diffusion heat treatment is provided to create the intermetallic compound.

4. A uniform packing structure, comprising a screen, coil, braid, cable, or mat incorporating the composite wire of claim 1.

5. A refrigeration device utilizing the composite wire of claim 1.

6. A refrigeration device utilizing the composite wire of claim 1 which is fabricated into a screen, coil, braid, cable or mat.

7. The composite wire of claim 1 wherein the barrier metal is on the order of about 6% by volume of the composite wire.

8. The composite wire of claim 1 wherein the barrier is less than 10% by volume of the wire.

9. The composite wire of claim 1 wherein the co-processing includes an extrusion step which is carried out by surrounding the barrier and rare earth material with a can formed of copper or copper alloy.

10. The composite wire of claim 1 wherein the core is essentially rare earth material and the sheath serves to protect said rare earth material from oxidation during heat treatment necessary to anneal the rare earth material between processing operations.

11. A composite wire for use as a magnetic regenerator refrigeration material, said wire having a surface to volume ratio in excess of 8,000 $m^2/m^3$ comprised of a core of rare earth containing material comprising an element selected from the group consisting of Yttrium, Scandium, Lanthanum, Cerium, Praseodynimum, Neodymium, Samarium, Eropium, Gadolinium, Terbium, Dysprosium, Holmium, Erbrium, Thulium, Ytterbium, and Lutetium, and mixtures and intermetallic compounds thereof, said core comprising essentially rare earth material, said core having a volumetric heat capacity in excess of 0.10 $J/Kcm^3$ at its curie point said core having no superconducting properties at 4.2° K., said composite wire containing a metal sheath surrounding said core and comprised of a pure metal, metal alloy or an assembly of two or more metal alloys which act as a diffusion barrier around said composite core, said metal sheath barrier comprising an element selected from the group consisting of Nb, Ta, V, Mo, and Ti, and mixtures thereof, said composite wire being formed by assembly of the raw materials at a larger size and co-processing to final wire by one or more extrusion, drawing, or rolling operations with an area reduction of at least 10 times, said metal sheath barrier being a relatively small portion of the total wire cross section.

12. The process of forming a composite wire having a surface to volume ration in excess of 10,000 $m^{2/}m^3$ comprised of a core of rare earth containing material comprising an element selected from the group consisting of Yttrium, Scandium, Lanthanum, Cerium, Prasedynimum, Neodynimum, Samarium, Europium, Gadolinium, Terbium, Dysprosium, Holmium, Erbrium, Thulium, Ytterbium, and Lutetium, and mixtures and intermetallic compounds thereof, said composite containing a metal sheath comprised of a pure metal, metal alloy or an assembly of two or more metal alloys which act as a diffusion barrier around said composite core, said barrier comprising an element selected from the group consisting of Nb, Ta, V, Mo, and Ti and mixtures thereof, said core having a volumetric heat capacity in excess of 0.10 $J/Kcm^3$ at its curie point, said core having no superconducting properties at 4.2° K., said composite wire being formed by assembly of the raw materials at a larger size and co-processing to final wire by one or more extrusion, drawing, or rolling operations with an area reduction of at least 10 times.

* * * * *

UNITED STATES PATENT AND TRADEMARK OFFICE
CERTIFICATE OF CORRECTION

PATENT NO. : 5,897,963
DATED : April 27, 1999
INVENTOR(S) : Seuntjens

It is certified that error appears in the above-identified patent and that said Letters Patent is hereby corrected as shown below:

Title Page, Item [75] "Bangam" should be - -Bangan- -.

Signed and Sealed this

Eighteenth Day of April, 2000

Attest:

Q. TODD DICKINSON

Attesting Officer          Director of Patents and Trademarks